US011145197B2

(12) United States Patent
Guo et al.

(10) Patent No.: US 11,145,197 B2
(45) Date of Patent: Oct. 12, 2021

(54) JOINT CONTROL OF VEHICLES TRAVELING ON DIFFERENT INTERSECTING ROADS

(71) Applicant: Mitsubishi Electric Research Laboratories, Inc., Cambridge, MA (US)

(72) Inventors: Jianlin Guo, Newton, MA (US); Fei Ye, Riverside, CA (US); Kyeong Jin Kim, Lexington, MA (US); Philip Orlik, Cambridge, MA (US); Heejin Ahn, Boston, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 265 days.

(21) Appl. No.: 16/351,910

(22) Filed: Mar. 13, 2019

(65) Prior Publication Data
US 2020/0294394 A1   Sep. 17, 2020

(51) Int. Cl.
*G08G 1/01*         (2006.01)
*H04W 4/44*         (2018.01)
(Continued)

(52) U.S. Cl.
CPC ......... *G08G 1/0145* (2013.01); *G08G 1/0116* (2013.01); *G08G 1/096725* (2013.01);
(Continued)

(58) Field of Classification Search
CPC ...... G08G 1/0145; G08G 1/164; G08G 1/166; G08G 1/20–207; G08G 1/22;
(Continued)

(56) References Cited

U.S. PATENT DOCUMENTS

2004/0083037 A1* 4/2004 Yamane ............... G08G 1/0104
                                                           701/1
2010/0134320 A1* 6/2010 Chevion ............... G08G 1/164
                                                          340/932
(Continued)

FOREIGN PATENT DOCUMENTS

JP        2016170482 A  *  9/2016

OTHER PUBLICATIONS

S. A. Fayazi and A. Vahidi, "Mixed-Integer Linear Programming for Optimal Scheduling of Autonomous Vehicle Intersection Crossing," in IEEE Transactions on Intelligent Vehicles, vol. 3, No. 3, pp. 287-299, Sep. 2018, doi: 10.1109/TIV.2018.2843163. (Year: 2018).*
(Continued)

*Primary Examiner* — Jeffrey C Boomer
*Assistant Examiner* — Paul Allen
(74) *Attorney, Agent, or Firm* — Gennadiy Vinokur; Hironori Tsukamoto

(57) ABSTRACT

A system jointly controls vehicles according to traffic configuration of a zone of intersection of a first road and a second road. The intersection zone includes a sequencing zone and a control zone covering sections of the first and the second road in proximity to the intersection. The system groups vehicles traveling within the sequencing zone on the first and the second roads into a set of groups of the vehicles and prevents the vehicles of different groups to travel concurrently in the control zone such that the first vehicle of the following group cannot pass the last vehicle of the preceding group. The system determines motion trajectories for the vehicles of the same group traveling in the control zone on the first and the second roads to pass the intersection and transmits the motion trajectories to the corresponding vehicles.

20 Claims, 13 Drawing Sheets

(51) Int. Cl.
 *G08G 1/0967* (2006.01)
 *G08G 1/16* (2006.01)
(52) U.S. Cl.
 CPC ....... *G08G 1/096783* (2013.01); *G08G 1/164* (2013.01); *H04W 4/44* (2018.02)
(58) Field of Classification Search
 CPC ........... G08G 1/096725; G08G 1/0116; G08G 1/096783; H04W 4/44
 USPC .................. 701/117–119; 340/906–932.1
 See application file for complete search history.

(56) References Cited

U.S. PATENT DOCUMENTS

| | | | | |
|---|---|---|---|---|
| 2011/0184596 | A1* | 7/2011 | Andreasson | B61L 23/34 701/19 |
| 2013/0124012 | A1* | 5/2013 | Shida | G08G 1/00 701/2 |
| 2014/0210645 | A1* | 7/2014 | Sharma | G08G 1/07 340/907 |
| 2019/0051158 | A1* | 2/2019 | Felip Leon | G08G 1/0116 |
| 2019/0130739 | A1* | 5/2019 | Khedkar | G08G 1/163 |
| 2019/0310648 | A1* | 10/2019 | Yang | G06N 20/00 |
| 2020/0008018 | A1* | 1/2020 | Moustafa | G08G 1/096783 |
| 2020/0189575 | A1* | 6/2020 | Wongpiromsarn | B60W 60/0011 |
| 2020/0193813 | A1* | 6/2020 | Sui | G01C 21/3492 |
| 2020/0298882 | A1* | 9/2020 | Kobayashi | B60W 60/0018 |
| 2020/0365015 | A1* | 11/2020 | Nguyen | G08G 1/0133 |
| 2020/0402397 | A1* | 12/2020 | Yamazaki | G01C 21/3407 |

OTHER PUBLICATIONS

Takashima Shunichiro—English Translation of JP-2016170482-A Description, via Espacenet patent translate, retrieved Jan. 8, 2021. (Year: 2021).*

* cited by examiner

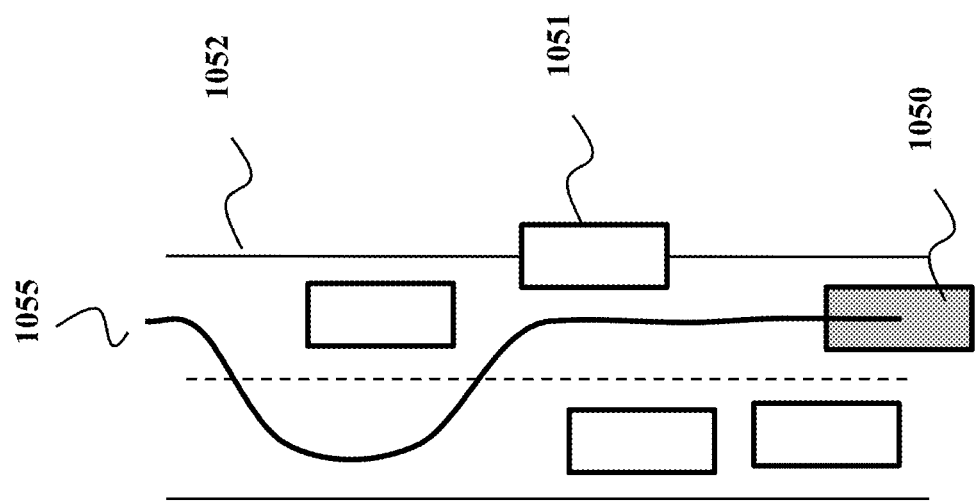

JOINT CONTROL OF VEHICLES TRAVELING ON DIFFERENT INTERSECTING ROADS

TECHNICAL FIELD

The invention relates generally to vehicle control, and more particularly to methods and apparatus for jointly controlling vehicles traveling on different roads.

BACKGROUND

Managing the efficient traffic flow over the nation's roadways is an extremely complex problem. In several metropolitan areas, roadways have reached, and even exceeded, their capacities further complicating the problem. One area that is particularly difficult to manage is the merging of two or more lanes of traffic into a single lane and/or intersecting of different lanes and roads. This can occur for a variety of reasons including roadway maintenance/construction that requires unfettered access to a lane of traffic thereby requiring closure of the lane, or the design of the roadway such that one lane is required to merge with another, a feature that is very common with roadway on-ramps.

Internet of Vehicle (IoV) is an inevitable convergence of mobile Internet and Internet of Things (IoT). The IoV enables information gathering, information sharing and information processing to effectively guide and supervise vehicles. The IoV is uniquely different from the IoT because of mobility, safety, V2X communication, energy conservation, security attacks, etc. In the IoV, information and communication technologies are applied in the infrastructure, vehicles and users to manage traffic and vehicle mobility. The IoV aims to provide innovative services and control for traffic management and enable users to be better informed and make safer, more coordinated, and smarter use of transportation networks.

More and more connected vehicles and autonomous vehicles are emerging. The mobility control of these types of vehicles are not only based on driver's actions, but also based on advanced control technologies using communications, sensors, optimal control techniques, etc. Unlike traditional control mechanisms such as traffic lights and stop signs, the advanced control mechanisms can optimize control efficiency by making real time optimal control decisions. Therefore, there is a need to extend control methods to joint control of vehicles traveling on intersecting roads so that vehicles do not need to stop in order to pass the intersection or highway merging point. As a result, there is a need to control the vehicles traveling on intersecting roads.

The development of autonomous vehicles has been emerging. Therefore, a lot of attentions has been drawn to the on-board control, in which vehicles use the communication data, the advanced devices such as radar, lidar, camera, GPS, etc., and artificial intelligence (AI) technologies to automatically control vehicle mobility. On-board control has its advantages in knowledge of the vehicle characteristics, e.g., engine, steering wheel, brake condition, vehicle model, vehicle size, etc. On-board control can make dynamic vehicle parameter configuration. However, on-board control has its disadvantages in information resource and communication capability to make optimal action decision. The on-board control devices cannot obtain information about neighbor vehicles, pedestrians and environment conditions that are out of their visible range.

Several methods exist to address the problems inherent in merge or intersecting zones though cooperative communication among different vehicles. For example, there are several systems employing smart or intelligent automobiles. The basic premise of all these systems is that the vehicles can be equipped with devices that allow them to communicate with each other in its vicinity on the roadway. Such vehicles are able to operate in a cooperative manner by communicating with each other and thereby allowing maximum safe throughput of vehicles on the roadway. Examples of this type of systems are disclosed in United States Patent Application numbers 2004/0260455, 2004/0068393 and 2005/0137783. However, the communication among these vehicles to ensure the safety and optimization of the vehicle control remains a challenging problem.

One shortcoming to these systems is that they require all vehicles to be equipped with special devices. Not only will this take several years to implement, it may be impossible to economically retrofit older vehicles. Specifically, there are different communication technologies have been developed to support vehicular communications. For example, IEEE has developed the Dedicated Short-Range Communications/Wireless Access in Vehicular Environments (DSRC/WAVE) standard family for vehicular networks. 3GPP has added new dedicated features to the cellular ecosystem to enable short range communications in the so-called cellular-vehicle-to-anything (C-V2X). Due to cost reason, it is impractical for a vehicle to install more than one short range communication technologies. Therefore, vehicles equipped with DSRC/WAVE cannot communicate with vehicles equipped with C-V2X, and vice versa. The information shortage and the communication capability constraint can severely limit the accuracy of the vehicle mobility control decision made by on-board control device.

Alternative approach of communication among vehicles is through a so called "cloud," i.e., through a remote server(s). The cloud model has been widely used in the IoT. The cloud model has its advantages in data storage, data processing capability and information sharing such as multimedia and map. However, the cloud model has its disadvantages to perform real time vehicle mobility control due to the long delay caused by multi-hop communication. In addition, the cloud does not have instant information of vehicles, pedestrians, and environment such as road condition and whether condition, which are critical to control vehicle mobility, especially autonomous vehicles.

Accordingly, there is still a need to provide a method for controlling vehicles in proximity to merging and interesting points.

SUMMARY

It is an object of some embodiments to provide a system and a method for joint control of vehicles traveling on intersecting roads. Additionally, or alternatively, it is another object of some embodiments to optimize control efficiency by making real time optimal control decisions so that vehicles do not need to stop to pass the intersection and/or highway merging point.

Some embodiments are based on the recognition of the complexity of such a joint control problem. For example, one of the issues addressed by some embodiments is an arrangement of the control system configured for real-time joint control. For example, some embodiments are based on recognition that the cloud control is impractical to optimally control the intersection passing and/or highway merging. The cloud control may not meet real time constraint of the safety requirement due to the multi-hop communication delay. In addition, the cloud does not have instant information of vehicles, pedestrians and road condition to make optimal decision. On the other hand, vehicle on-board control may not have sufficient information to make optimal decision, e.g., on-board control does not have information about object movement out of the visible range and cannot receive information from vehicles outside of the communication range. In addition, on-board control may also have communication limitation due to the existence of the heterogeneous vehicular communication technologies such as IEEE Short-Range Communications/Wireless Access in Vehicular Environments (DSRC/WAVE) and 3GPP Cellular-vehicle-to-Anything (C-V2X), e.g., a vehicle equipped with IEEE DSRC/WAVE radio cannot communication with a vehicle equipped with 3GPP C-V2X radio.

To that end, some embodiments are based on realization that the edge devices such as roadside unit (RSU) are feasible control points to make optimal decision on real time control of the intersection passing or highway merging due to their unique features such as direct communication capability with vehicles, road condition knowledge and environment view via cameras and sensors. In addition, edge devices at a control point such as the intersection or highway merging point can make joint control decision via real time collaboration and information sharing. To that end, some embodiments apply edge devices to realize real time edge control.

The advanced vehicle mobility control is done by running control methods using effective communication data and sensor data. Vehicular environment is a highly dynamic environment. Besides the vehicular dynamics, there are unpredictable environment dynamics, e.g., random movement of objects such as pedestrians and animals, sudden events caused by trees and infrastructure. Therefore, the control methods need to be rapidly adaptable to the entire environment dynamics. The runtime of control methods depends on the number of vehicles, complexity of control techniques, resources of the control device, etc. To guarantee the safety, the computation runtime needs to be below a threshold. For a control device, it is impractical to dynamically update its control techniques and computation resources. However, it is feasible to adjust the number of vehicles involved for each run of the control techniques.

Some embodiments are based on recognition that it is desired to control vehicles traveling on intersecting roads optimally, e.g., without the need to stop them to make the other vehicles pass. Some embodiments are based on recognition that, in general, this optimization task can be solved with various motion planning methods. However, when a number of the vehicles approaching the control point is too large, the optimization problem can be too complicated to be solved online or to avoid the safety constraint violation.

To that end, some embodiments are based on realization that to guarantee the safety of the road intersection passing or highway merging, the number and/or state of the vehicles approaching the control point should be constrained, i.e., limited. To that end, some embodiments partition the section of the roads approaching the control point into at least the sequencing zone and the control zone. In the sequencing zone, the vehicles are grouped into groups (clusters) and the vehicles of different groups are prevented to travel within the control zone concurrently in the sense that the first vehicle of the following group (cluster) cannot pass the last vehicle of the preceding group (cluster). In such a way, the number of vehicles within the control zone is limited. When the vehicles are in the control zone, the embodiments determine the motion trajectory and motion strategy for these vehicles in the same group. Because the number of vehicles in the control zone are limited, the embodiments ensure the safety and optimality of passing the intersection.

To that end, some embodiments partition the roads approaching the control point into the sequencing zone and the control zone based on state of vehicles, road conditions and road geometry. Each zone includes sections of multiple roads on which the vehicles are moving towards control point such as the intersection and highway merging point. For each road, the control zone is a section between the control point and the sequencing zone ending point. The objective of joint control for the sequencing zone is to select a number of vehicles for the control zone such that the control methods can generate safe trajectories for passing the intersection or merging into highway for the vehicles in the control zone. The objective of control in the control zone is to generate safe motion trajectories that can optionally optimize a metric of performance. The size of section on different road can be different. The partitioning can be performed by various methods. As used herein, a motion trajectory of a vehicle defines locations of the vehicle as a function of time.

For example, in one embodiment, zone partitioning is based on traffic speed such that the higher traffic speed is, the bigger zones are. Additionally, or alternatively, in one embodiment, zone partitioning is based on traffic density such that the higher density is, the smaller zones are. Additionally, or alternatively, in one embodiment, zone partitioning is based on a number of lanes of the road such that the more lanes are, the smaller zones are. Additionally, or alternatively, in one embodiment, zone partitioning is based on a number of intersecting roads such that the more roads are, the smaller zones are. Additionally, or alternatively, in one embodiment, zone partitioning is based on combination of traffic speed, traffic density, lane numbers and road numbers.

Some embodiments are based on the recognition that edge computing can precompute some information to group the vehicles in the sequencing zone. The information including vehicle states, road map, road condition, the maximum number of vehicles allowed in the control zone, etc., can be computed before the vehicles enter sequencing zone.

To that end, some embodiments are based on realization that the edge computing stores the road map and the maximum number of vehicles allowed in the control zone into the memory, dynamically collects vehicle states and road condition such as pedestrian information via cameras and sensors of edge devices. Before vehicles enter the sequencing zone, edge computing communicates with vehicles to obtain their states.

Some embodiments are based on the recognition that vehicle grouping in sequencing zone is to prevent the vehicles of different groups (clusters) to travel concurrently into the control zone to increase control complexity and computation error in the sense that the first vehicle of following group (cluster) cannot pass the last vehicle of the preceding group (cluster). The vehicles in a group (cluster) may include vehicles from different intersecting roads moving towards to a control point, such as a road intersection or a road merging point.

To that end, some embodiments are based on realization that vehicle grouping is based on the estimated time of vehicle arriving at the control zone. In sequencing zone, edge computing calculates the estimated arriving time for each vehicle based on its current state and road map. The vehicles with similar arriving time are grouped into same group (cluster). For each group (cluster), edge computing computes optimal arriving times by solving the Mixed- Integer Linear Programming problem and determines speed constraints to ensure groups (clusters) arriving at control zone sequentially. In effect, this computation allows vehicles to pass the intersection without stopping. The vehicles of different groups (clusters) are prevented to enter the control zone concurrently in the sense that the first vehicle of following group (cluster) cannot pass the last vehicle of the preceding group (cluster). In effect, the clustering of the vehicles in the different groups put constraints on computational complexity of the motion trajectories determination problem allowing to solve the motion scheduling problem in real time. The optimal arriving times, speed constraints, and/or motion trajectories are sent to the corresponding vehicles.

Some embodiments are based on the recognition that vehicles in the control zone are controlled to optimally travel through control zone based on motion trajectory and motion strategy determined by control techniques.

To that end, some embodiments are based on realization that the edge computing controls vehicles in control zone to optimize some metric of performance, e.g., to minimize overall fuel consumption. Edge computing divides time interval from time vehicle entering the control zone to the time vehicle arriving at control point into multiple time steps and computes motion trajectory and control strategy for each vehicle at each time step by using optimal arriving time, vehicle state and road map. At each time step, the control strategy includes location, velocity, acceleration, etc. In some implementations, the motion trajectories are determined to minimize overall fuel consumption or to minimize overall air pollutant emission. The motion trajectory and control strategy can be obtained by solving a constraint shortest path problem or a quadratic programming problem.

Accordingly, one embodiment discloses a system for jointly controlling vehicles, which includes a memory configured to store a traffic configuration of a zone of intersection of a first road and a second road, wherein the intersection zone includes a sequencing zone and a control zone, wherein the sequencing zone includes a section of the first road and a section of the second road in proximity to the intersection, and wherein the control zone includes a section of the first road and a section of the second road between the intersection and the corresponding sections of the sequencing zone; a processor configured to group vehicles traveling on the first road and on the second road within the sequencing zone into a set of groups of the vehicles; prevent the vehicles of different groups to travel concurrently in the control zone such that the first vehicle of the following group cannot pass the last vehicle of the preceding group; determine motion trajectories for the vehicles of the same group traveling in the control zone on the first and the second roads to pass the intersection; and transmit the motion trajectories to the corresponding vehicles.

Another embodiment discloses a method for jointly controlling vehicles, wherein the method uses a processor coupled to a memory storing a traffic configuration of a zone of intersection of a first road and a second road, wherein the intersection zone includes a sequencing zone and a control zone, wherein the sequencing zone includes a section of the first road and a section of the second road in proximity to the intersection, and wherein the control zone includes a section of the first road and a section of the second road between the intersection and the corresponding sections of the sequencing zone, wherein the processor is coupled with stored instructions implementing the method, wherein the instructions, when executed by the processor carry out steps of the method, which includes grouping vehicles traveling on the first road and on the second road within the sequencing zone into a set of groups of the vehicles; preventing the vehicles of different groups to travel concurrently in the control zone in the sense that the first vehicle of the following group cannot pass the last vehicle of the preceding group; determining trajectories for the vehicles of the same group traveling in the control zone on the first and the second roads to pass the intersection; and causing the vehicles in the control zone to follow the corresponding trajectories.

Yet another embodiment discloses a non-transitory computer readable storage medium embodied thereon a program executable by a processor for performing a method. The method includes accessing a traffic configuration of a zone of intersection of a first road and a second road, wherein the intersection zone includes a sequencing zone and a control zone, wherein the sequencing zone includes a section of the first road and a section of the second road in proximity to the intersection, and wherein the control zone includes a section of the first road and a section of the second road between the intersection and the corresponding sections of the sequencing zone; grouping vehicles traveling on the first road and on the second road within the sequencing zone into a set of groups of the vehicles; preventing the vehicles of different groups to travel concurrently in the control zone in the sense that the first vehicle of the following group cannot pass the last vehicle of the preceding group; determining trajectories for the vehicles of the same group traveling in the control zone on the first and the second roads to pass the intersection; and causing the vehicles in the control zone to follow the corresponding trajectories.

BRIEF DESCRIPTION OF THE DRAWINGS

FIG. 10C shows a schematic of an autonomous or semi-autonomous controlled vehicle for which a dynamically feasible and often optimal trajectory is computed by using some embodiments.

DETAILED DESCRIPTION

Figure 1:
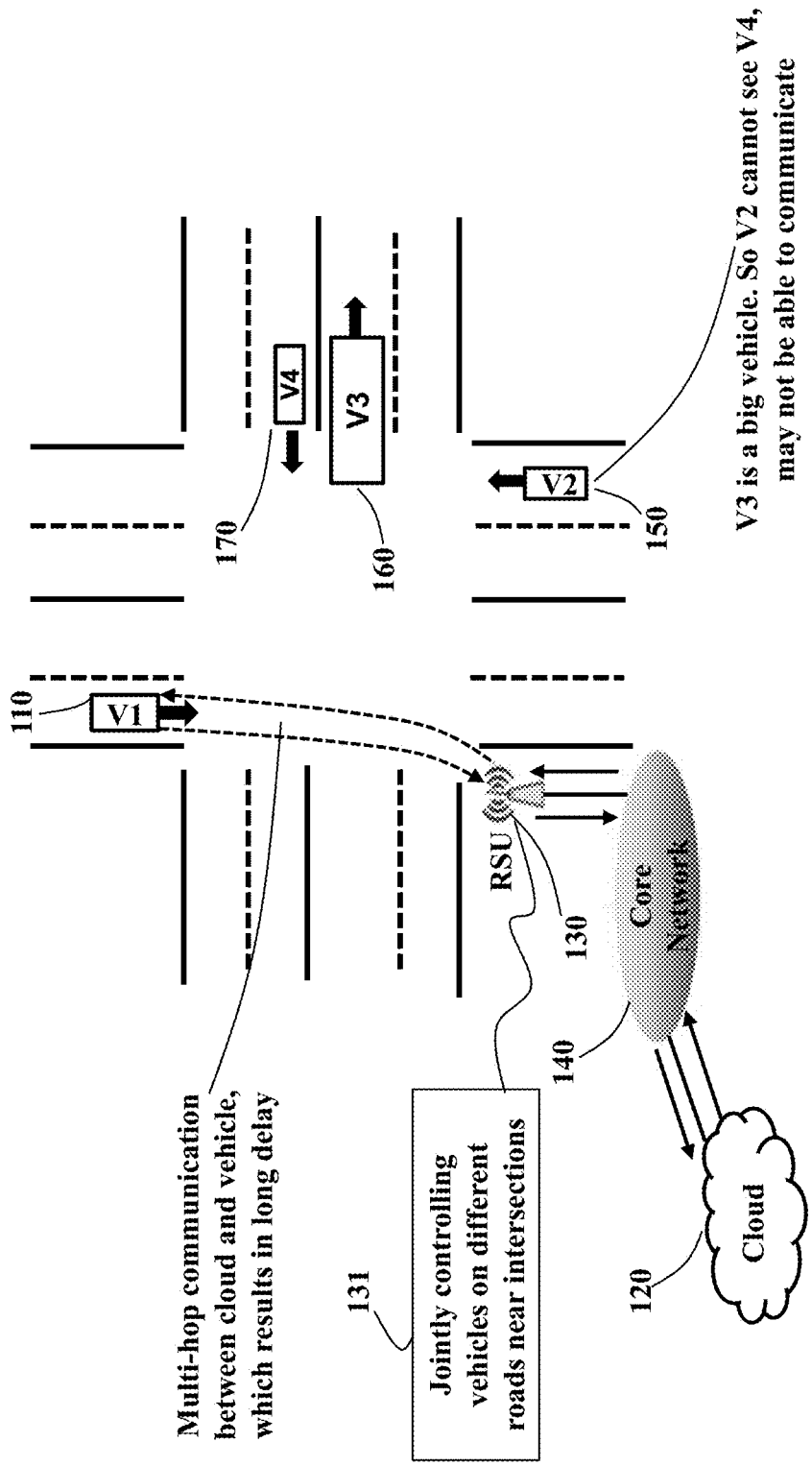
FIG. 1 shows a traffic scenario illustrating some problems addressed by some embodiments.

FIG. 1 shows a traffic scenario illustrating some problems addressed by some embodiments. Some embodiments are based on recognition that to establish communication among different vehicles on the roads in the IoV environment, information transfer between cloud and vehicle needs to go through core infrastructure network and road side unit (RSU) as shown in FIG. 1, where the communication between vehicle V1 110 and cloud 120 needs to go through RSU 130 and core network 140. However, multi-hop long latency makes cloud based vehicle control approach impractical for real-time control and service.

In addition, the on-board control devices cannot obtain information about neighbor vehicles, pedestrians and environment conditions that are out of their visible range. FIG. 1 shows an example, in which vehicle V2 150 intends to pass intersection once big vehicle V3 160 passes intersection. However, a small vehicle V4 170 is moving into intersection and the big vehicle V3 blocks vehicle V2 from seeing small vehicle V4. As a result, V2 and V4 might collide because communication link between V2 and V4 might also be blocked.

In addition, on-board control may also have communication limitation. There are different communication technologies have been developed to support vehicular communications. IEEE has developed the Dedicated Short-Range Communications/Wireless Access in Vehicular Environments (DSRC/WAVE) standard family for vehicular networks. 3GPP has added new dedicated features to the cellular ecosystem to enable short range communications in the so-called cellular-vehicle-to-anything (C-V2X). Due to cost reason, it is impractical for a vehicle to install more than one short range communication technologies. Therefore, vehicles equipped with DSRC/WAVE cannot communicate with vehicles equipped with C-V2X, and vice versa. The information shortage and the communication capability constraint can severely limit the accuracy of the vehicle mobility control decision made by on-board control device.

Some embodiments are based on realization that IoV-Edge device, e.g., RSU, has advantages in real time vehicle mobility control compared with remote cloud and on-board device: (1) The IoV-Edge devices installed at intersection or highway merging point can directly communicate with vehicles approaching the intersection or merging point; (2) The IoV-Edge devices can be equipped with multiple communication technologies and therefore, can communicate with all vehicles; (3) IoV-Edge devices can achieve real time collaboration on vehicle states and environment view via robust high speed communication links; (4) IoV-Edge devices are stationary, which makes communication between IoV-Edge devices and vehicles more reliable and the environmental data collected have higher quality; and (5) IoV-Edge devices can continuously monitor vehicle traffic and the environment for accurate decision making. All these features make the IoV-Edge device appropriate point to make optimal vehicle mobility control decision.

Control point selection is critical to perform real time vehicle mobility control. The cloud control cannot meet real time constraint of the safety requirement due to the multi-hop communication delay. In addition, the cloud does not have instant information of vehicles, pedestrians and road condition to make optimal decision. On-board control does not have comprehensive information to make optimal decision. In addition, on-board control may also have communication limitation due to the existence of the heterogeneous vehicular communication technologies such as IEEE DSRC/WAVE and 3GPP C-V2X. The edge devices such as RSU are feasible points to make optimal decision on real time vehicle control due to their direct communication capability, road condition knowledge, environment view and real rime collaboration capability.

Therefore, some embodiments utilize edge devices to perform edge computing for realizing real-time optimal vehicle control at the intersection and highway merging point. In this disclosure, the edge devices 130 such as RSU or eNodeB are called the IoV-Edge. To that end, in some embodiments, the edge device 130 is configured for jointly controlling 131 vehicles traveling on different roads near the intersections.

Figure 2:
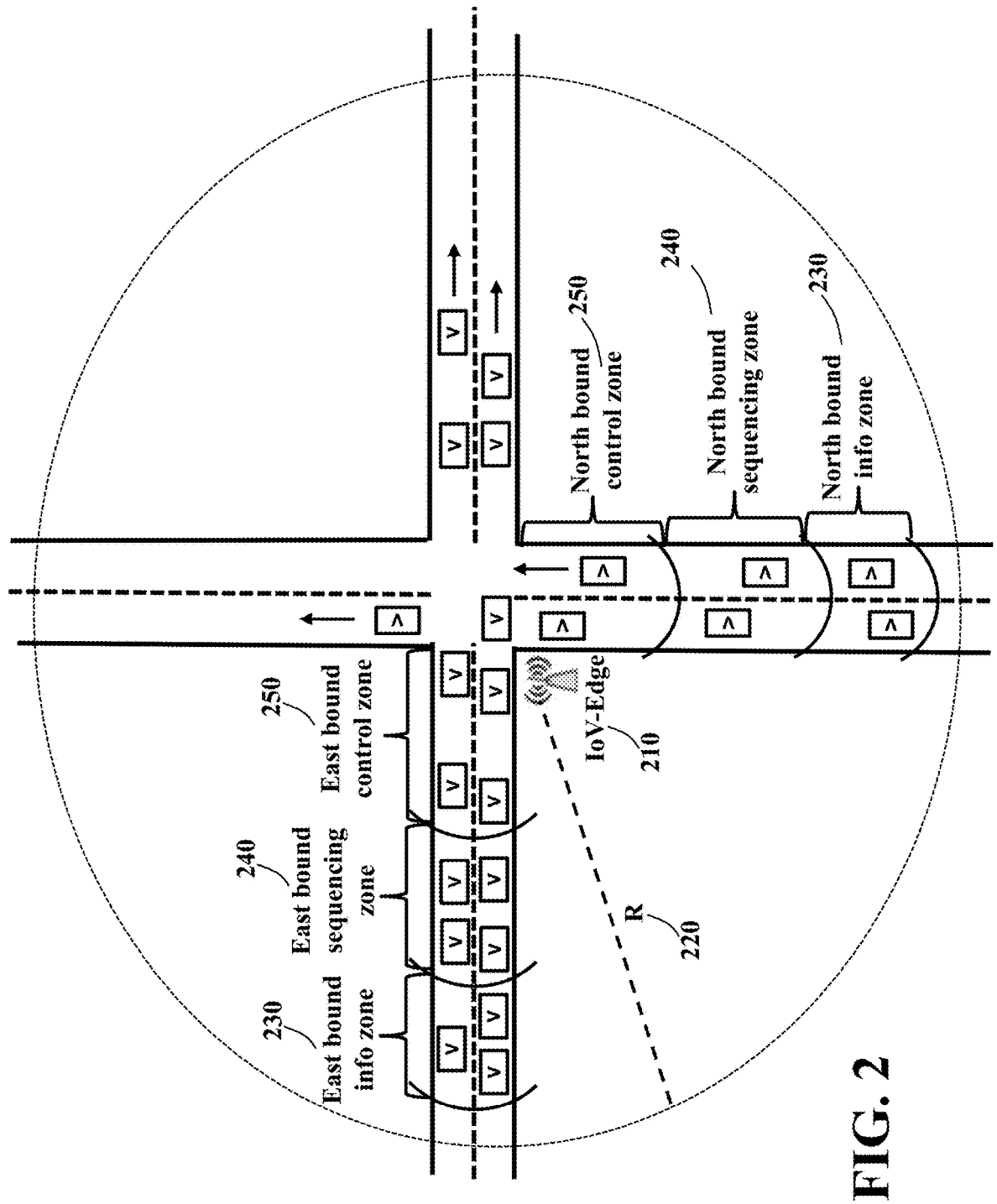
FIG. 2 shows a schematic diagram illustrating zone partition in proximity to a road intersection according to some embodiments.

FIG. 2 shows a schematic diagram illustrating zone partition in proximity to a road intersection according to some embodiments. To make safe and optimal control decision, the IoV-Edge installed at control point such as intersection or highway merging point partition roads within communication range into three zones as shown in FIG. 2, which illustrates a two direction intersection zone partition, where the east bound road intersects with the north bound road. The IoV-Edge 210 is located at the intersection. The communication range between the IoV-Edge and vehicles is R 220. The road sections within the communication range are partitioned into information zone 230, sequencing zone 240 and control zone 250.

In the information zone 230, the IoV-Edge communicates with vehicles and collects vehicle information such as ID, location, speed, acceleration, lane information, intention at intersection, etc. In the sequencing zone 240, the IoV-Edge computes the estimated arrival time to the control zone based on vehicle state and road map, groups vehicles into groups (clusters), determines an optimal time for each vehicle to arrive at the control point and computes a speed limit for each vehicle to maintain the clusters entering control zone sequentially. The control point is the geometric location where roads intersect, e.g., highway merging point. The IoV-Edge determines motion trajectory in the control zone for each vehicle based on optimal arrival time, vehicle location, vehicle speed, vehicle acceleration, speed limit, acceleration limit, headway constraint, road map, etc. The motion trajectory is expressed in the form vehicle location, vehicle speed, and vehicle acceleration at different time steps. The IoV-Edge controls vehicle mobility based on the motion trajectory.

The vehicular environment is a highly dynamic environment. Besides the vehicular dynamics, there are unpredictable environment dynamics, e.g., random movement of objects such as pedestrians and animals, sudden events caused by trees and infrastructure. Therefore, the control methods need to be rapidly adaptable to the entire environment dynamics. In other words, control methods must be fast enough to reflect the dynamics of vehicular environment. The runtime of control methods depends on the number of vehicles involved, complexity of control techniques, resources of the control device, etc. To guarantee the safety, the computation time needs to be below a threshold. The IoV-Edge is equipped with appropriate control techniques and computing resources. For the IoV-Edge, it is impractical to dynamically update its control techniques and computation resources. However, it is feasible to adjust the number of vehicles involved to reduce the runtime of the control techniques.

Figure 3:
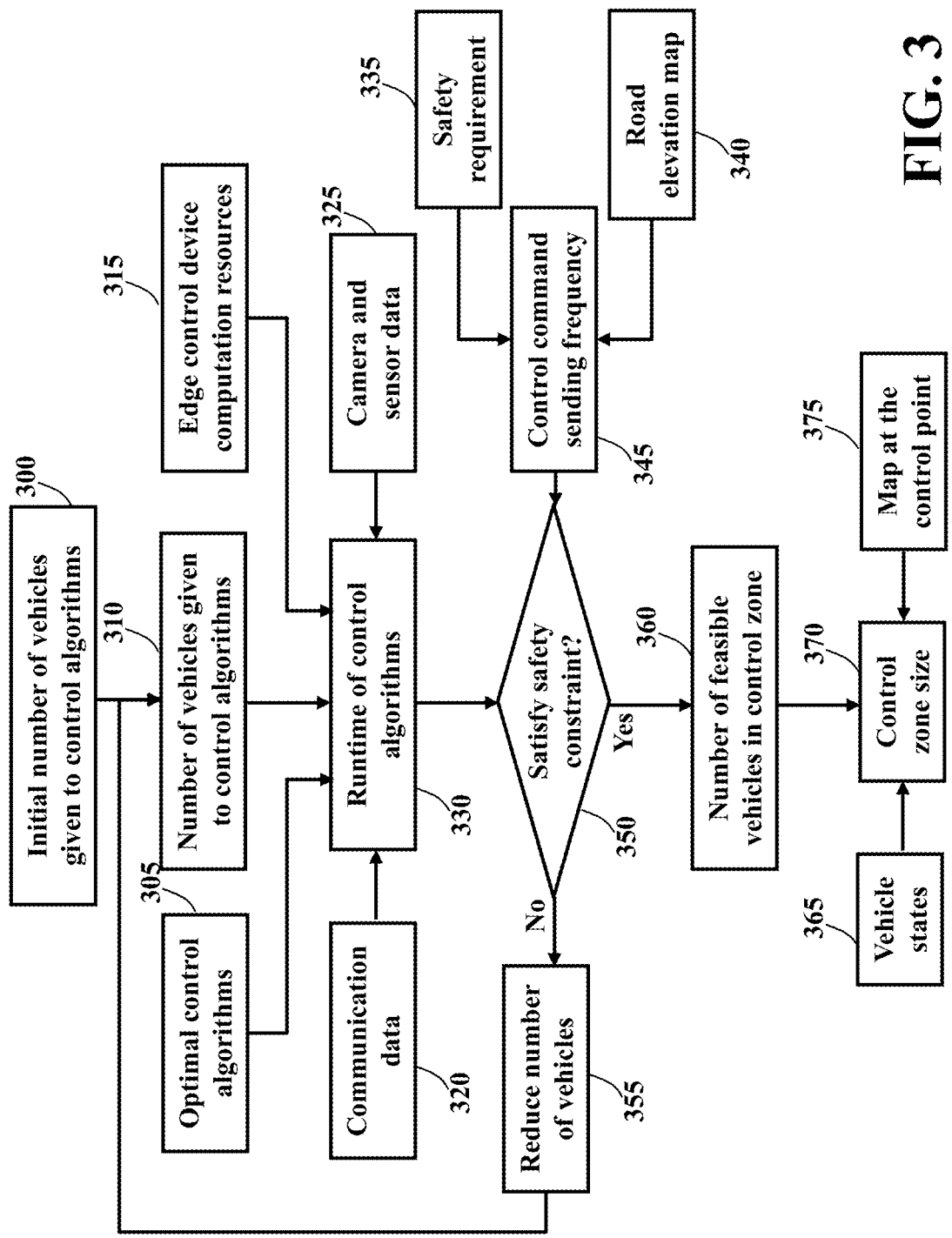
FIG. 3 shows a block diagram of a method for determining the maximum number of vehicles in control zone to make optimal control decision according to some embodiments.

FIG. 3 shows a block diagram of a method for determining the maximum number of vehicles in control zone to make optimal control decision according to some embodiments. In some implementations, this method is performed offline. Initially, IoV edge can select a large enough number of vehicles 300. Given control techniques, computing resources and road map information at a control point, the IoV-Edge uses control algorithms 305, initial number of vehicles 300 as number of vehicles 310, computing resources 315, communication data 320 and sensor data 325 as inputs to calculate the runtime of the control techniques 330. On the other hand, the IoV-edge computes control commends sending frequency 345 based on safety requirement 335 and road map 340. The IoV-Edge then checks if the runtime can satisfy safety constraint 350. If no, the IoV-Edge reduces number of vehicles 355 and repeats process. The reduced number of vehicles is then used as the number of vehicles 310 for re-calculation. If yes, the number of input vehicles 310 is the number of feasible vehicles in the control zone 360. Once the maximum number of vehicles determined, the IoV-Edge can determine the zone size 370 using vehicle states 365 and map information 375.

In various embodiments, the number of vehicles in a group (cluster) is less than the maximum number of vehicles allowed in the control zone. Once the maximum number of vehicles allowed in the control zone is determined, the zone partition can be performed based on different metrics. For example, zone partition can be based on traffic speed such that the higher traffic speed is, the bigger zones are; zone partition can be based on traffic density speed such that the higher density is, the smaller zones are; zone partition can based on number of lanes of the road such that the more lanes are, the smaller zones are; zone partition can be based on number of intersecting roads such that the more roads are, the smaller zones are; and zone partition can be done based on combination of traffic speed, traffic density, lane numbers and road numbers. Because traffic condition and road condition are different from road to road the size of the zone is also different from road to road. Following is a method for zone partition.

At a control point, let $N_c^{max}$ be the maximum number of vehicles allowed in the control. Assume vehicles approach the control point from $N_R$ roads $R_1, R_2, \ldots, R_{N_R}$. On a road $R_i$ (i=1, 2, ..., $N_R$), the density of vehicles in the direction approaching control point is $D_i$. Let $Z_i$ be the control zone size for road $R_i$. The total number of vehicles $N_c$ in the control zone is given by $$N_c = \sum_{i=1}^{N_R} D_i \times Z_i \quad (1)$$

The zone partition is to select appropriate $Z_i$ such that $N_c \leq N_c^{max}$. Because the speed is different on different road. Therefore, the control zone partition is formulated as following linear optimization problem $$\max_{Z_i} N_c \quad (2)$$

subject to $$N_c \leq N_c^{max} \quad (3)$$

$$Z_i > 0 \quad (4)$$

$$Z_i \geq Z_j \text{ if } V_{R_i} \geq V_{R_j} \quad (5)$$

where $V_{Ri}$ and $V_{Rj}$ are average speed on road $R_i$ and road $R_j$, respectively. The constraint (3) ensures that the number of vehicles in the control zone does not exceed the threshold. The constraint (4) indicates that all relevant roads must be considered. The constraint (5) takes vehicle speed into account. The higher the speed is, the bigger the zone size is. This is because that the distance headway is bigger on the higher speed road.

The information zone is determined such that the IoV-Edge can get necessary information from vehicles. Assume vehicles broadcast their states every $T_b$ time period, e.g., using IEEE DSRC/WAVE, vehicles broadcast their states every 100 milliseconds. Therefore, the length of the information zone for road $R_i$ is $V_{Ri} * T_b$. Using this length, the information zone can be determined.

In some embodiments, once both control zone and information are determined for a road, the remaining section of the within communication range is the sequencing zone. Additionally, or alternatively, the remaining section of the within communication range can be partitioned on the sequencing and the information zone. In the information zone, some embodiments collect information about the vehicle for the grouping. The information zone is preceding the sequencing zone, and some embodiments determine states of vehicles traveling within the information zone and track the state of the vehicles within the information zone to estimate current state of the vehicles within the sequencing zone. In some implementations, the information zone implemented as a part of the sequencing zone.

Figure 4:
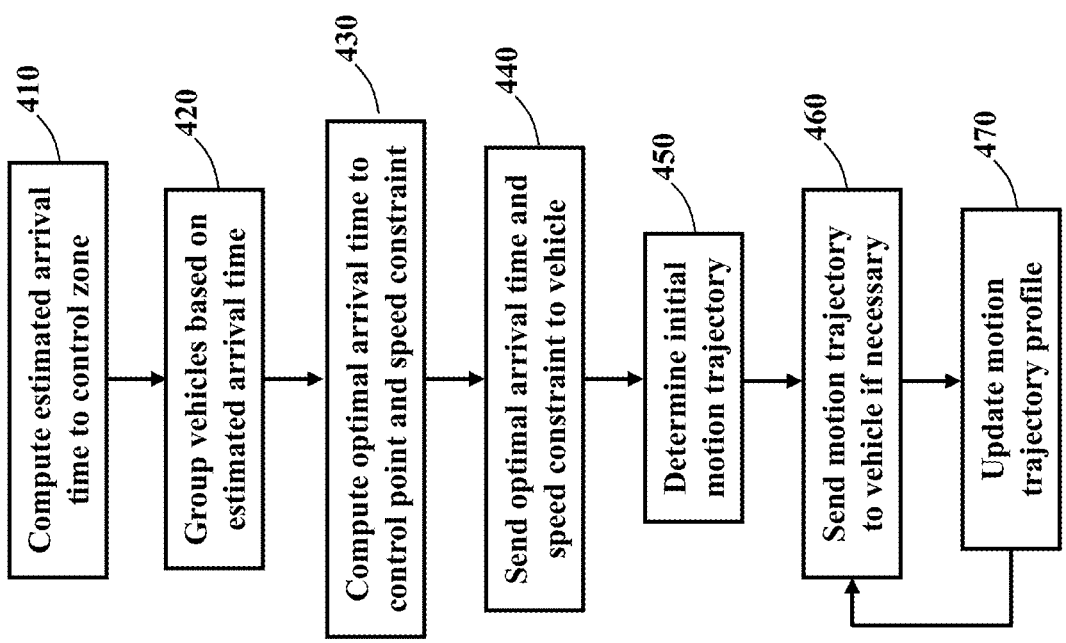
FIG. 4 shows a functional block diagram of a method for performing a joint vehicle control at the control point according to some embodiments.

FIG. 4 shows a functional block diagram of a method for performing a joint vehicle control at the control point according to some embodiments. After the zone partition is done, the IoV-Edge performs the operations as shown in FIG. 4 for joint control, where the IoV-Edge computes an estimated arrival time to control zone for each vehicle in the sequencing zone based on vehicle state and road map 410. The IoV-Edge then groups vehicles in the sequencing zone into groups (clusters) based on the estimated arrival time 420. The IoV-Edge then computes an optimal arrival time to control point by applying the Mixed-Integer Linear Programming problem described later and a speed constraint for each vehicle 430. The speed constraint is to ensure the vehicle groups (clusters) entering the control zone sequentially and this constraint is different from the speed limit set by traffic regulatory. Next, the IoV-Edge sends optimal arrival time and speed constraint to vehicle 440. Before vehicles enter the control zone, the IoV-Edge determines vehicle motion trajectory for each vehicle 450 and sends motion trajectory to vehicle 460. Once vehicles enter the control zone, the IoV-Edge may keep updating motion trajectory 470 to adapt for instant information change. The updated trajectory is sent to vehicle if it is necessary.

Figure 5:
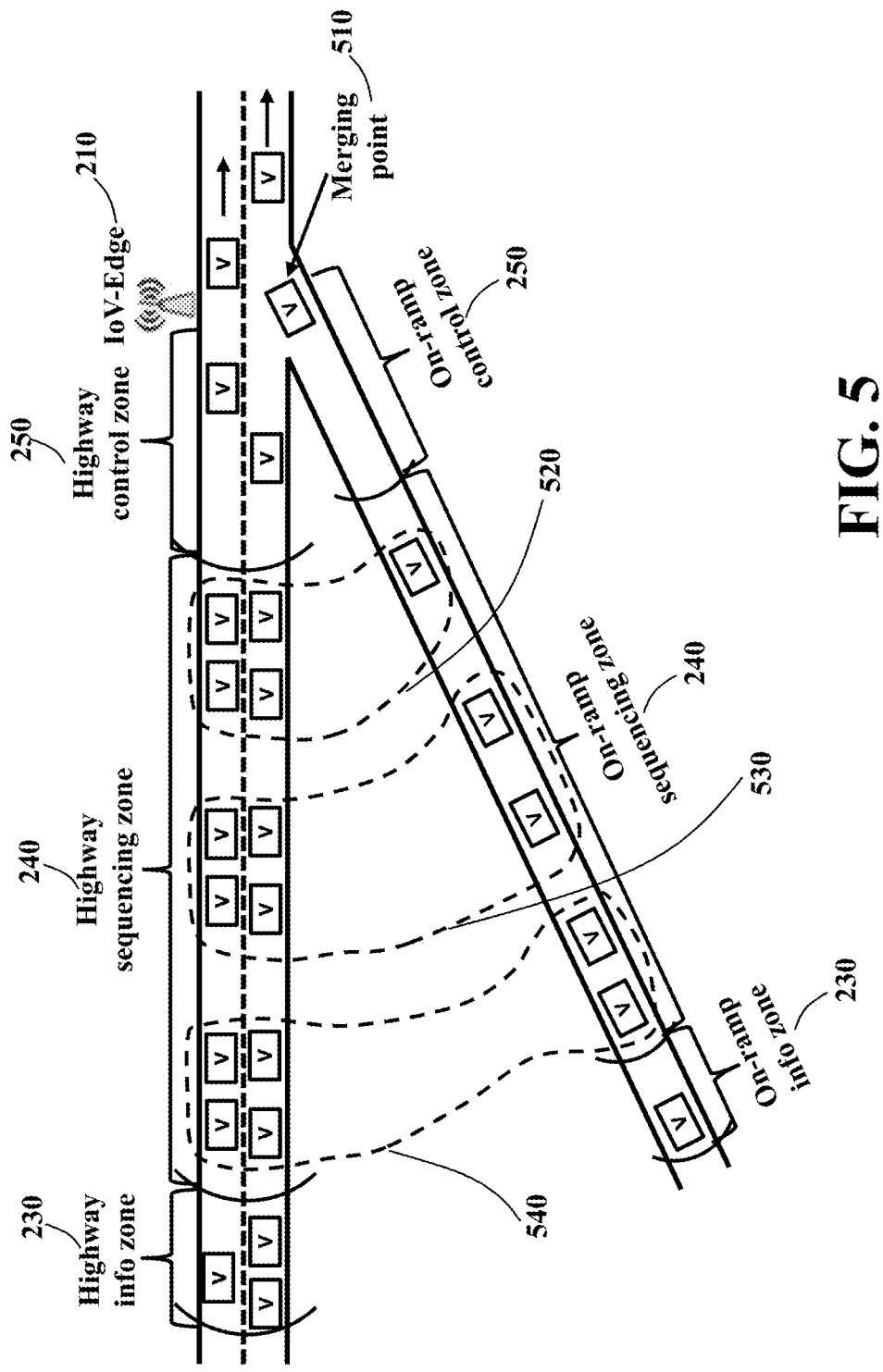
FIG. 5 shows an exemplar schematic of a vehicle grouping for the highway merging according to one embodiment.

FIG. 5 shows an exemplar schematic of a vehicle grouping for the highway merging according to one embodiment. In this example, section of highway and section of ramp are partitioned into information zone 230, sequencing zone 240 and control zone 250. The IoV-Edge 210 is located at merging point 510, i.e., control point. The vehicles in the sequencing zone are grouped into three clusters: group 520, group 530 and group 540.

Figure 6:
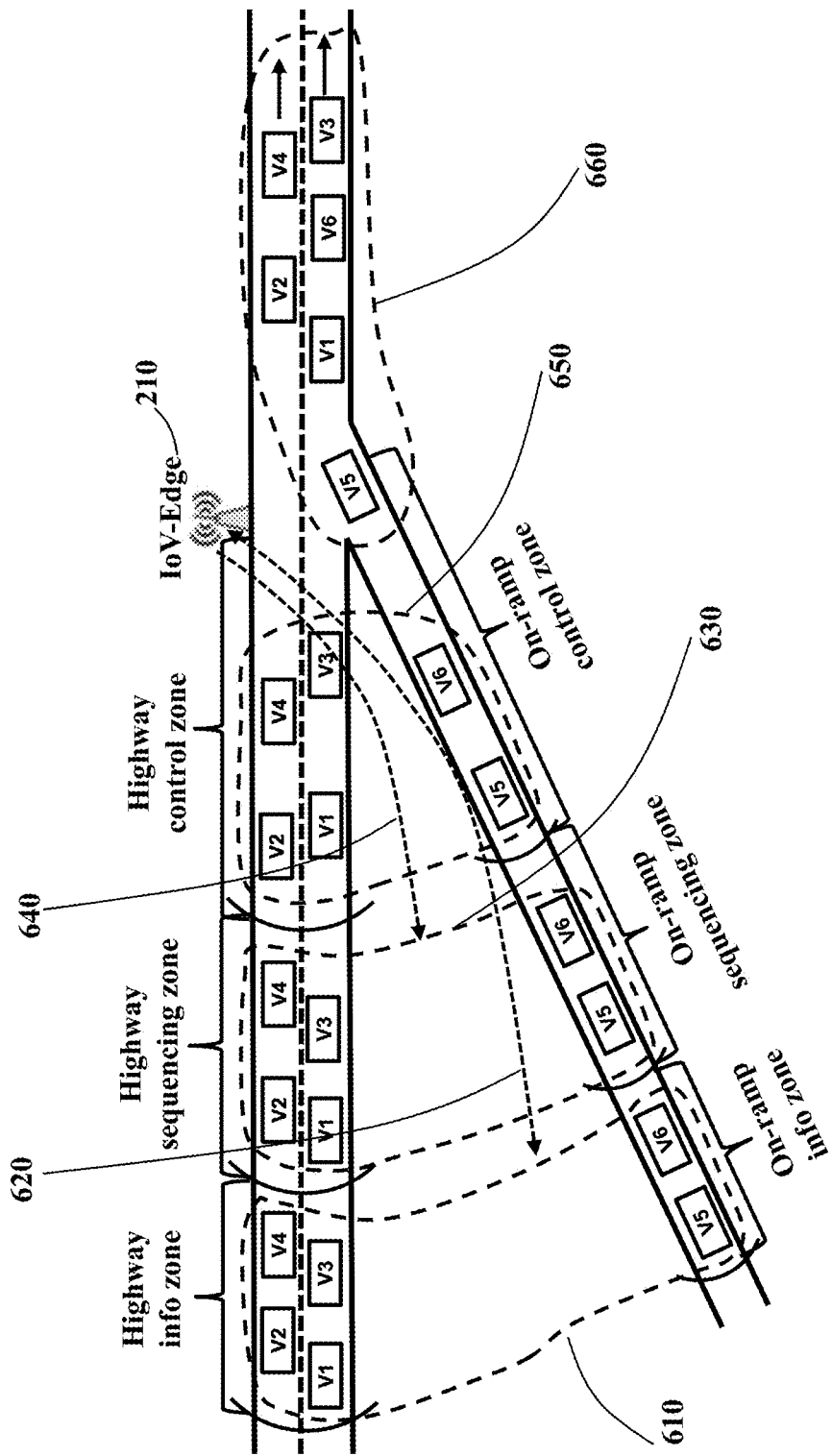
FIG. 6 shows snapshots of same group of vehicles in the different zone for the highway merging, where the IoV-Edge is located at merging point according to one embodiment.

FIG. 6 shows snapshots of same group of vehicles in the different zone for the highway merging, where the IoV-Edge 210 is located at merging point, i.e., control point according to one embodiment. The group of vehicles 610 enter the information zone and communicate 620 with the IoV-Edge 210 for their states. The group of vehicles 630 then enter the sequencing zone, where optimal merging time, speed constraint and motion trajectory are sent to vehicles 640. The vehicles then move to the control zone, where vehicle moves according to motion trajectory. As can be seen, vehicles v1 and v3 speed up to accommodate the merging of vehicles v5 and v6 650. Finally, merging completes and vehicles pass merging point in the order of v3, v6, v1 and v5 660.

There are different ways to compute the estimated arrive time, e.g., the estimated arrival time can be calculated by using the speed of vehicle entering sequencing zone and distance to the access point. Let $D_R$ be the distance from starting of sequencing zone to the starting of control zone on the road R and $v_i$ is speed of vehicle i, then the estimated arrival time for vehicle i is $D_R/v_i$.

The speed constraint is estimated such that for two consecutive groups (clusters) on same road, the time the last vehicle of the first group (cluster) entering the control zone is early than the time the first vehicle of the second group (cluster) entering control zone. Let $t_i^0$ (i=1, 2, ..., I) be the time of vehicles in the first group (cluster) entering sequencing zone and $v_i$ be the corresponding speed of vehicles in the first group (cluster); and $t_j^0$ (j=1, 2, ..., J) be the time of vehicles in the second group (cluster) entering sequencing zone and $v_j$ be the corresponding speed of vehicles in the second group (cluster), then the time the last vehicle of the first group (cluster) entering control zone is given by $t_{last}=\max\{t_i^0+D_R/v_i\}$ and the time the first vehicle of the second group (cluster) entering control zone is given by $t_{first}=\min\{t_j^0+D_R/v_j\}$. The constraint $t_{last}<t_{first}$ gives that for any vehicle i in the first group (cluster), its speed satisfies $v_i>D_R/(t_{first}-t_i^0)$ and for any vehicle j in the second group (cluster), its speed satisfies $v_j<D_R/(t_{last}-t_j^0)$.

In some embodiments, computing the optimal arrival time is formulated as a Mixed-Integer Linear Programming (MILP) problem. For a vehicle with ID=i, its state includes vehicle position, vehicle speed, distance to the control point, lane number, the time vehicle entering to the sequencing zone and the earliest possible time vehicle arriving at the control point, i.e., $\{x_i, v_i, d_i, l_i, t_i^0, t_i^{min}\}$. Assume vehicles follow regulatory speed rule with the maximum allowed speed $v_{max}$, i.e., $v_i \leq v_{max}$. Then, $t_i^{min}$ is given by $t_i^{min}=v_i+a_{max}*\Delta t_i$, where $a_{max}$ is the maximum allowed acceleration, $\Delta t_i$ is the time needed for vehicle i to increase its speed from $v_i$ to $v_{max}$ with the maximum acceleration $a_{max}$. For the optimization problem, decision variables are the optimal arrival times $t_i^{op}$ (i=1, 2, ..., N), where N is number of vehicles in a group (cluster). The objective function is defined as $$J = \sum_{i=1}^{N} (t_i^{op} - t_i^0) \quad (6)$$

and optimization problem is defined as $$\min_{t_i^{op}} J \quad (7)$$

Subject to constraints $$t_i^{op} > t_i^{min} \quad (8)$$

$$t_i^{op} - t_j^{op} \geq t_{headway}, \forall i,j \in \{1,2,\ldots,N\} \text{ with } l_i = l_j \quad (9)$$

where $t_{headway}$ is time headway between the adjacent vehicles on a road and can be different for different road. As can be seen, the objective of the MILP problem (7) is to minimize the total travel time for all vehicles in a group (cluster) through the control zone. The constraint (8) ensures that vehicle will not violate the speed limit through the control zone. The other two constraints (9) ensures the safety headway for vehicles on the same lane is maintained. Solving the optimization problem given by (6)-(9) gives the optimal arrival times for vehicles in a group (cluster). There are several optimization problem solvers can be applied to solve the formulated problem, e.g., IBM CPLEX solver.

After obtaining the optimal arrival time, the next task is to determine motion trajectory, which can be expressed in the form of (time, location, velocity, acceleration).

Figure 7:
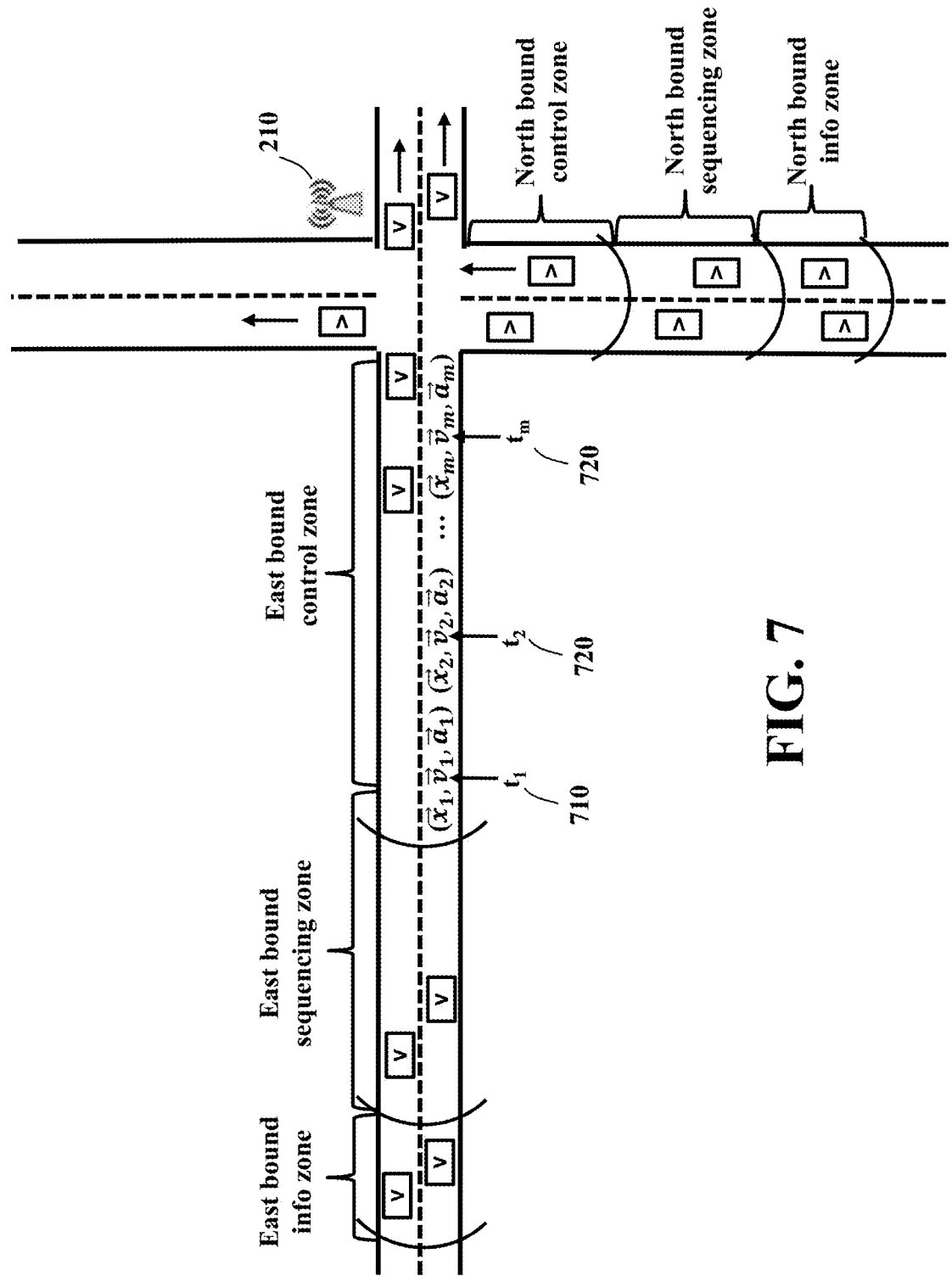
FIG. 7 shows an example of control or motion trajectory determined by some embodiments.

FIG. 7 shows an example of control or motion trajectory determined by some embodiments. The motion trajectory defines location of the vehicle as a function of time. For example, the motion trajectory specifies at each instance of time values of one or combination of location, velocity, acceleration of the vehicle. In this example, the trajectory defines that at time $t_1$ 710, (location, velocity, acceleration)=$(\vec{x}_1, \vec{v}_1, \vec{a}_1)$, at time $t_2$ 720, (location, velocity, acceleration)=$(\vec{x}_2, \vec{v}_2, \vec{a}_2)$, and finally at time $t_m$ 730, (location, velocity, acceleration)=$(\vec{x}_m, \vec{v}_m, \vec{a}_m)$.

The objective of the trajectory planning is to minimize cost function such as vehicle energy consumption or air pollutant emission through control zone while following the assigned optimal arrival time to access point.

It has been proven that the vehicle energy consumption highly relies on vehicle type, the acceleration/deceleration, speed profile, road grade, etc. The optimization problem becomes a constrained nonlinear programming problem. Solving that constrained nonlinear programming problem is quite challenge. The non-convexity and high non-linearity usually lead to great computational cost and hardly feasible for real-time microscopic vehicle control.

Different embodiments use different methods to compute optimal vehicle trajectory at the IoV-Edge. For example, one embodiment uses a graph based optimal trajectory planning method.

Figure 8:
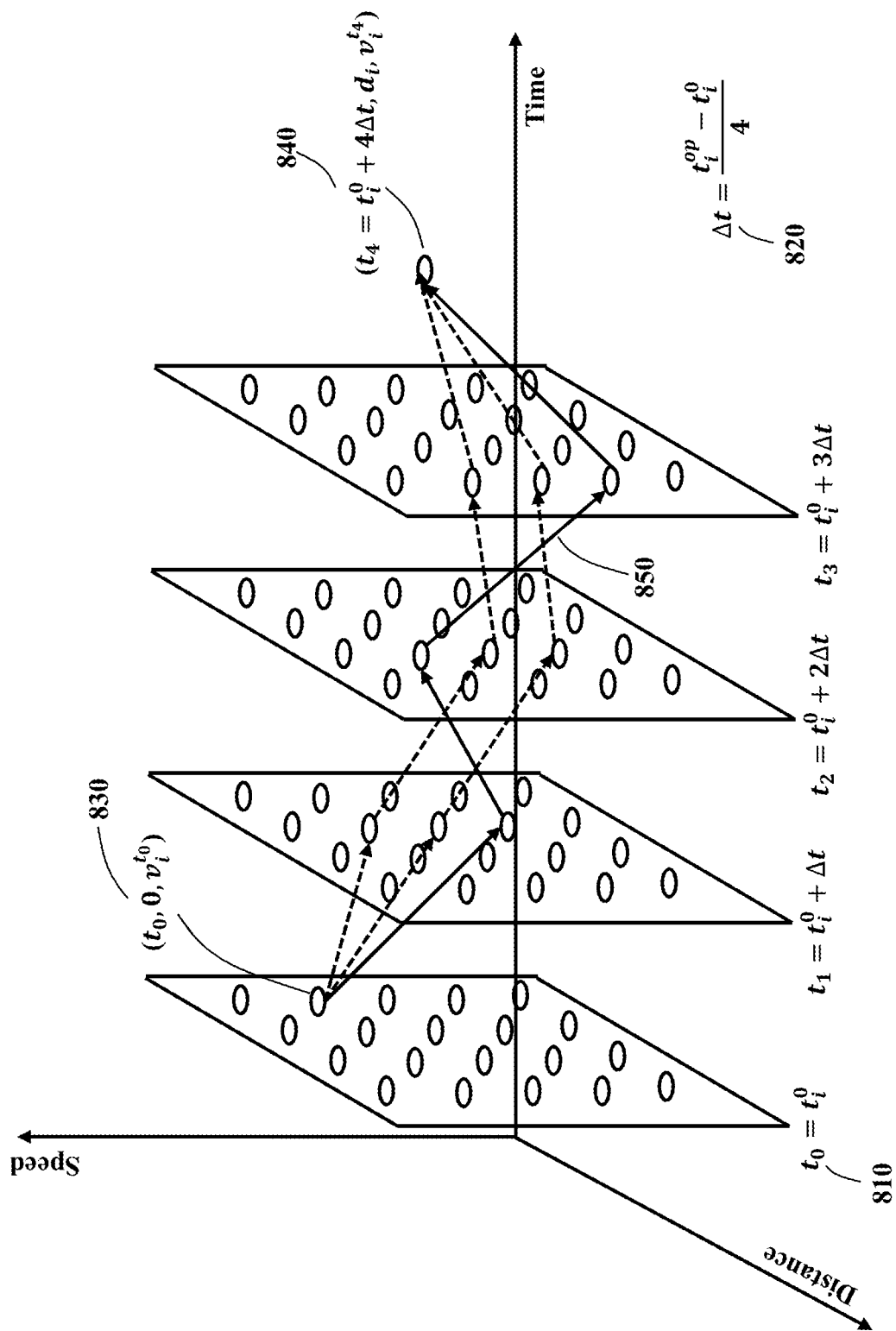
FIG. 8 shows a schematic of a graph based vehicle motion trajectory planning method according to some embodiments.

FIG. 8 shows a schematic of a graph based vehicle motion trajectory planning method according to some embodiments. To enable optimization of the energy consumption, a graph based optimal trajectory planning approach is provided with constraints on safe headway, maximum velocity, maximum capable acceleration/deceleration rate, etc. To formulate this graph based problem, the time, location and velocity are discretized. Each node of the directed graph is expressed as $(t_i, x_i, v_i)$.

The state transition diagram is illustrated in FIG. 8, where for simplicity, the distance traveled from time to is used instead of location and the speed is used instead of velocity. The planning computation starts at time $t_0$ 810 with time step $\Delta t$ 820. At time $t_0$, the distance traveled equals to zero. In the graph, the source node is $(t_0, 0, v_i^{t0})$ 830 and destination node is $(t_4, d_i, v_i^{t4})$ 840. At each time step, the feasible nodes for the next time step is determined using current node and constraints from speed limit, acceleration limit, maximum power and capability of braking system. For the edge transition from the node $(t_i, x_i, v_i)$ to node $(t_{i+1}, x_{i+1}, v_{i+1})$, there is a cost as the energy consumption during this state transition process. Therefore, there can be many paths from source node 830 to destination node 840. As a result, graph based optimal trajectory planning problem is converted to the problem of finding paths that minimizes overall energy consumption for all vehicles of a group (cluster). In FIG. 8, the path 850 is the optimal path for a vehicle based on energy consumption.

Assume the path $P_i$ for vehicle i consists of $M_i$ edges $e^m_i$ (m=1, 2, ..., $M_i$) and for edge $e^m_i$, the corresponding energy cost is $c^m_i$. For vehicles in a group (cluster), total energy cost is given by $$C_T = \sum_{i=1}^{N} \sum_{m=1}^{M_i} c_i^m \quad (10)$$

Then, graph based optimal trajectory planning is to find a path $P^o_i$ for each vehicle i (i=1, 2, ..., N) such that $$C_{P_O} = \min_P C_T \quad (11)$$

where $P_o=(P^o_1, P^o_2, \ldots, P^o_N)$ and $P=(P_1, P_2, \ldots, P_N)$.

There are existing methods that can be applied to find the shortest path in the directed graph, e.g., Dijkstra's shortest path algorithm.

Quadratic programming based optimal trajectory planning approach can be used to maximize comfort and minimize air pollutant emission.

The embodiments formulate the problem as minimizing the $L^2$-norm of the control input, i.e., acceleration/deceleration rate, to provide a feasible trajectory based on quadratic programming technique and optimize overall vehicle mobility benefits such as air pollutant emission reduction.

Vehicle dynamic equations are as follows:

$$\begin{cases} x_i(t_{k+1}) = x_i(t_k) + \dfrac{v_i(t_{k+1}) + v_i(t_k)}{2}\Delta t \\ v_i(t_{k+1}) = v_i(t_k) + a_i(t_k)\Delta t \end{cases} \quad (12)$$

The quadratic programming problem using convex objective function can be expressed by a positive definite matrix H as $$\min_{a_i} \sum_{i=1}^{N} a_i^T H a_i \quad (13)$$

subject to $$x_i(t_i^{op}) = d_i \quad (14)$$

$$0 \leq v_i(t_k) \leq v_{max} \quad (15)$$

$$a_{min} \leq a_i(t_k) \leq a_{max} \quad (16)$$

$$|x_i(t_k) - x_j(t_k)| \geq d_{headway} \quad (17)$$

$$x_i(t_0) = x_i^0, v_i(t_0) = v_i^0 \quad (18)$$

where acceleration rate $a_i$ is the control input, H is a positive definite matrix such as unit matrix, $d_i$ is the current distance to control point, $\Delta t$ is time step, $x_i^0$ and $v_i^0$ are the location and velocity at time $t_0$, respectively, $d_{headway}$ is the safety distance between adjacent vehicles.

Solving the optimization problem given by (13)-(18) gives the optimal acceleration rate $a_i$ for vehicle i. Substituting $a_i$ into (12) obtains $v_i$ and $x_i$. As a result, trajectory ($t_i$, $x_i$, $v_i$, $a_i$) is obtained for vehicle i.

Figure 9:
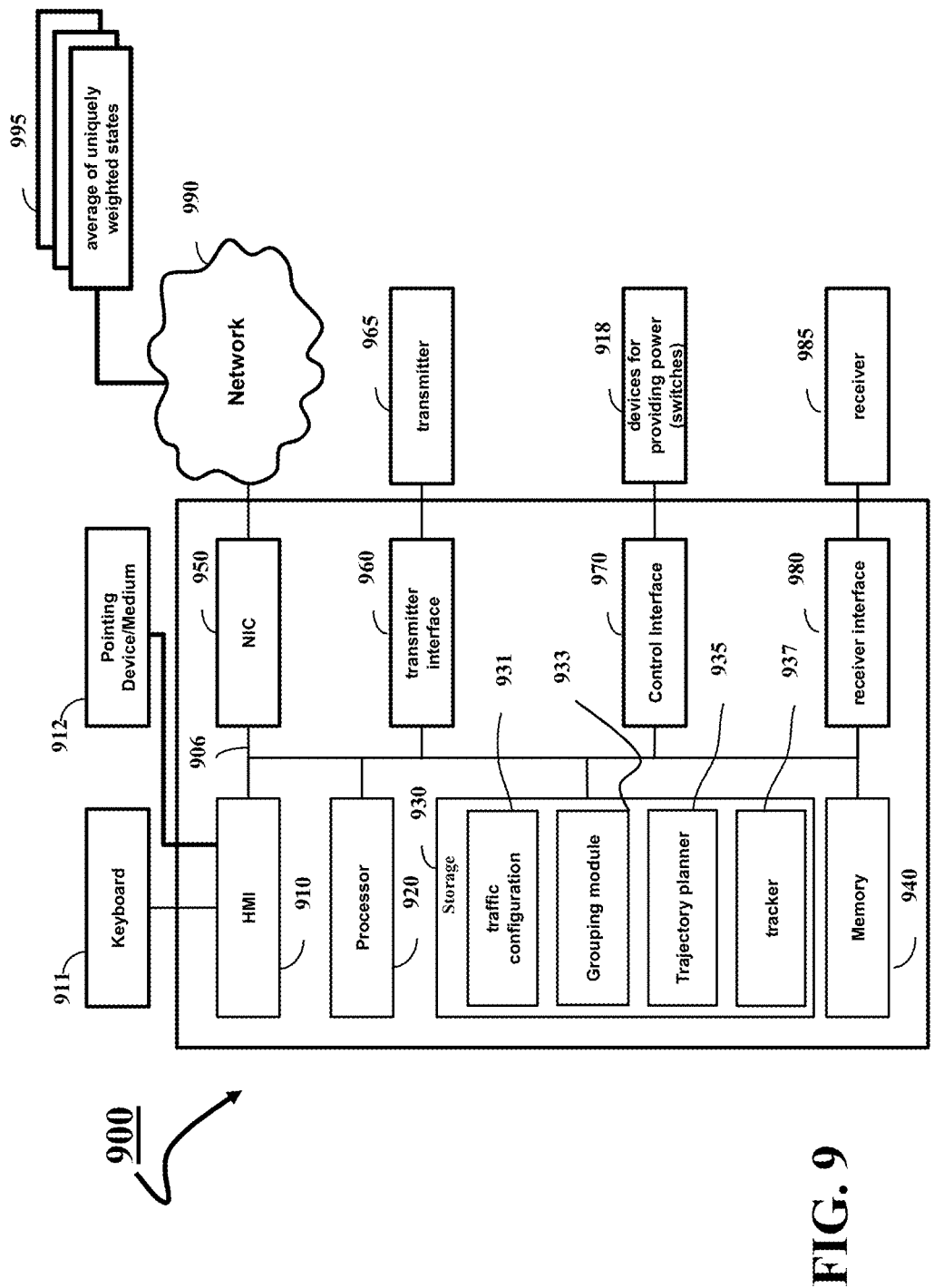
FIG. 9 shows a block diagram of a control system for jointly controlling vehicles in accordance with some embodiments.

FIG. 9 shows a block diagram of a control system 900 for jointly controlling vehicles in accordance with some embodiments. The control system 900 is arranged at the IoV-Edge in proximity to a control point such as merging and/or intersection of the roads. Such an arrangement shows the edge device to include or be operatively connected to a set of sensors to collect traffic information in the intersection zone and transmit to the vehicles in the control zone the corresponding trajectories.

The control system 900 can have a number of interfaces connecting the system 900 with other systems and devices. For example, a network interface controller (NIC) 950 is adapted to connect the system 900 through the bus 906 to a network 990 connecting the control system 900 with the devices 918 of vehicular network. Examples of such devisee includes vehicles, traffic lights, traffic sensors, etc. For example, the control system 900 includes a transmitter interface 960 configured to command, using a transmitter 965, the devices 918 to reach moved in a prescribed manner. Through the network 990, using a receiver interface 980 connected to a receiver 985, the system 900 can receive traffic information in the intersection zone. Additionally or alternatively, the control system 900 includes a control interface 970 configured to transmit commands to the devices to change their states. The control interface 970 can use the transmitter 965 to transmit the commands and/or any other communication means.

In some implementations, a human machine interface 910 within the system 900 connects the system to a keyboard 911 and pointing device 912, wherein the pointing device 912 can include a mouse, trackball, touchpad, joy stick, pointing stick, stylus, or touchscreen, among others. The system 900 can also be linked through the bus 906 to a display interface adapted to connect the system 900 to a display device, such as a computer monitor, camera, television, projector, or mobile device, among others. The system 900 can also be connected to an application interface adapted to connect the system to equipment for performing various power distribution tasks.

The system 900 includes a processor 920 configured to execute stored instructions, as well as a memory 940 that stores instructions that are executable by the processor. The processor 920 can be a single core processor, a multi-core processor, a computing cluster, or any number of other configurations. The memory 940 can include random access memory (RAM), read only memory (ROM), flash memory, or any other suitable memory systems. The processor 920 is connected through the bus 906 to one or more input and output devices. These instructions implement a method for joint vehicle control.

To that end, the control system 900 includes a traffic configuration 931. For example, the traffic configuration includes a structure of a zone of intersection of a first road and a second road. In some embodiments, the structure of the intersection zone includes a sequencing zone and a control zone. The sequencing zone includes a section of the first road and a section of the second road in proximity to the intersection, and wherein the control zone includes a section of the first road and a section of the second road between the intersection and the corresponding sections of the sequencing zone. In such a manner, the traffic configuration 931 allows the system 900 to control vehicles in different zones differently.

The control system 900 includes a grouping module 933 configured to group vehicles traveling within the sequencing zone into a set of groups of the vehicles. After the vehicles are grouped, the grouping module 933 is configured to prevent the vehicles of different groups to travel concurrently in the control zone such that the first vehicle of the following group cannot pass the last vehicle of the preceding group. For example, the grouping module 933 determines different motion constraints for the vehicles of different groups to prevent the vehicles of different groups to travel concurrently in the control zone ensuring that the first vehicle of the following group cannot pass the last vehicle of the preceding group. For example, if the vehicles in the sequencing zone are grouped into a first group and a second group, wherein the grouping module 933 can determine a minimum speed constraint for the vehicles of the first group and a maximum speed constraint for the vehicles of the second group. Additionally, the grouping module 933 can also determine other constraints on the motion of the vehicle, such as a lane shift constraint, a speed constraint, an acceleration constraint, and a headway constraint. These additional constraints can further simplify the joint control.

The control system 900 includes a trajectory planner 935 determine motion trajectories for the vehicles of the same group traveling in the control zone on the first and the second roads to pass the intersection. Because the grouping module 933 limits number of vehicles in the control zone, the trajectory planner 935 can determine motion trajectories of the vehicles in the control zone in real time. In some embodiments, the trajectory planner 935 determines the motion trajectories in two stages. During the first stage, the trajectory planner 935 solves a mixed-integer linear problem to determine optimal time of vehicle arriving at intersection and speed constraints ensuring that the vehicles of different groups arrive at intersection sequentially. In the second stage, the trajectory planner 935 solves the optimal trajectory problem for determining motion trajectories for different vehicles according to the sequential arrival on the intersection while also optimizing a metric of performance, such as energy consumption of the vehicles.

In some embodiments, the intersection zone includes an information zone preceding the sequencing zone. In these embodiments, the control system 900 includes a tracker 937 configured to determine states of vehicles traveling within the information zone, and track the state of the vehicles within the information zone to estimate current state of the vehicles within the sequencing zone. In effect, the tracking in the information zone allows to ensure proper grouping of the vehicles.

Figure 10A:
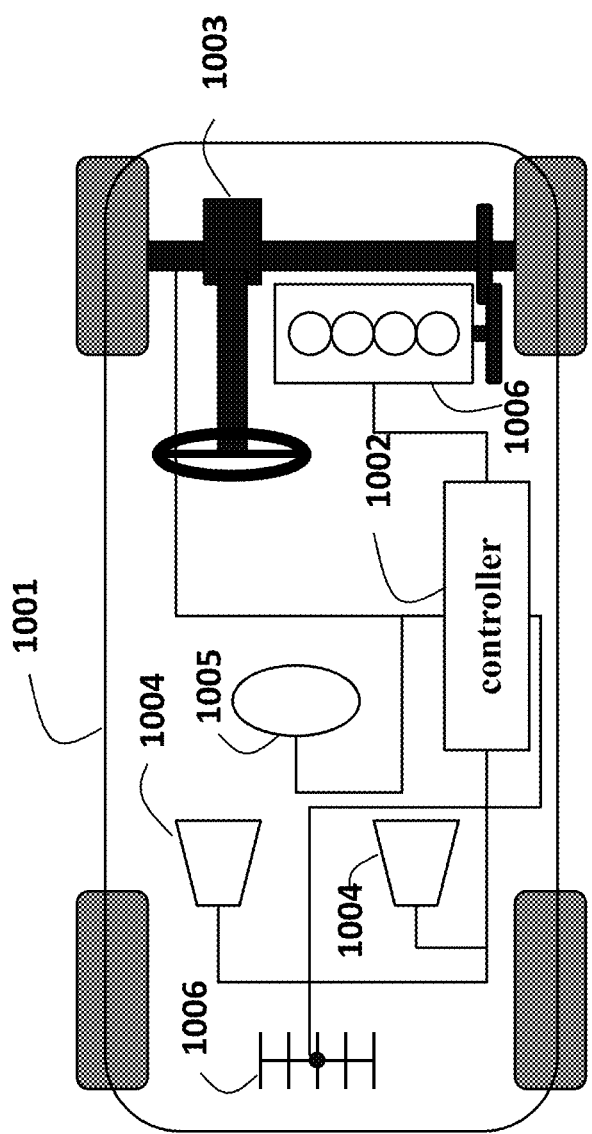
FIG. 10A shows a schematic of a vehicle including a controller of a vehicle in communication with the control system of FIG. 9.

FIG. 10A shows a schematic of a vehicle 1001 including a controller 1002 in communication with control system employing principles of some embodiments. As used herein, the vehicle 1001 can be any type of wheeled vehicle, such as a passenger car, bus, or rover. Also, the vehicle 1001 can be an autonomous or semi-autonomous vehicle. For example, some embodiments control the motion of the vehicle 1001. Examples of the motion include lateral motion of the vehicle controlled by a steering system 1003 of the vehicle 1001. In one embodiment, the steering system 1003 is controlled by the controller 1002. Additionally, or alternatively, the steering system 1003 can be controlled by a driver of the vehicle 1001.

The vehicle can also include an engine 1006, which can be controlled by the controller 1002 or by other components of the vehicle 1001. The vehicle can also include one or more sensors 1004 to sense the surrounding environment. Examples of the sensors 1004 include distance range finders, radars, lidars, and cameras. The vehicle 1001 can also include one or more sensors 1005 to sense its current motion quantities and internal status. Examples of the sensors 1005 include global positioning system (GPS), accelerometers, inertial measurement units, gyroscopes, shaft rotational sensors, torque sensors, deflection sensors, pressure sensor, and flow sensors. The sensors provide information to the controller 1002. The vehicle can be equipped with a transceiver 1006 enabling communication capabilities of the controller 1002 through wired or wireless communication channels with control system of some embodiments. For example, through the transceiver 1006, the controller 1002 receives the motion trajectory and control actuators and/or other controllers of the vehicle according to the received trajectory.

Figure 10B:
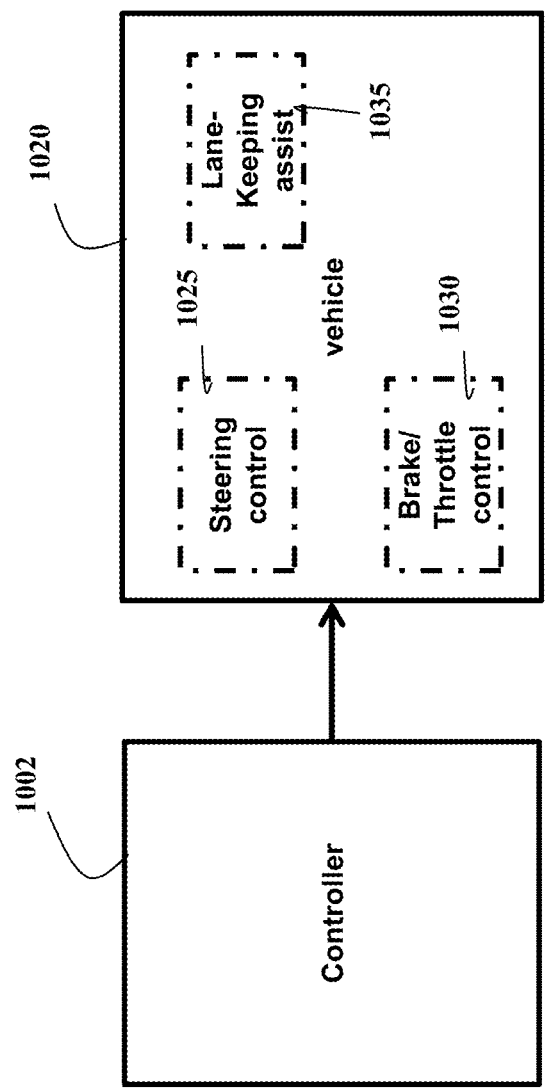
FIG. 10B shows a schematic of interaction between different controllers of the vehicle according to some embodiments.

FIG. 10B shows a schematic of interaction between the controller 1002 and the controllers 1020 of the vehicle 1001 according to some embodiments. For example, in some embodiments, the controllers 1020 of the vehicle 1001 are steering 1025 and brake/throttle controllers 1030 that control rotation and acceleration of the vehicle 1020. In such a case, the predictive controller 1002 outputs control inputs to the controllers 1025 and 1030 to control the state of the vehicle. The controllers 1020 can also include high-level controllers, e.g., a lane-keeping assist controller 1035 that further process the control inputs of the predictive controller 1002. In both cases, the controllers 1020 maps use the outputs of the predictive controller 1002 to control at least one actuator of the vehicle, such as the steering wheel and/or the brakes of the vehicle, in order to control the motion of the vehicle.

FIG. 10C shows a schematic of an autonomous or semi-autonomous controlled vehicle 1050 for which a dynamically feasible, and often optimal trajectory 1055 can be computed by using some embodiments. The generated trajectory aims to keep the vehicle within particular road bounds 1052, and aims to avoid other uncontrolled vehicles, i.e., obstacles 1051 for the controlled vehicle 1050. In some embodiments, each of the obstacles 1051 can be represented by one or multiple inequality constraints in a time or space formulation of the mixed-integer optimal control problem, including one or multiple additional discrete variables for each of the obstacles. For example, based on embodiments configured to implement a mixed-integer model predictive controller, the autonomous or semi-autonomous controlled vehicle 1050 can make discrete decisions in real time such as, e.g., pass another vehicle on the left or on the right side or instead to stay behind another vehicle within the current lane of the road 1052.

In some embodiments, to control the vehicle, the control inputs include commands specifying values of one or combination of a steering angle of the wheels of the vehicle and a rotational velocity of the wheels, and the measurements include values of one or combination of a rotation rate of the vehicle and an acceleration of the vehicle. Each state of the vehicle includes a velocity and a heading rate of the vehicle, such that the motion model relates the value of the control inputs to a first value of the state of the vehicle through dynamics of the vehicle at consecutive time steps, and the measurement model relates the value of the measurement to a second value of the state of the vehicle at the same time step.

Figure 11:
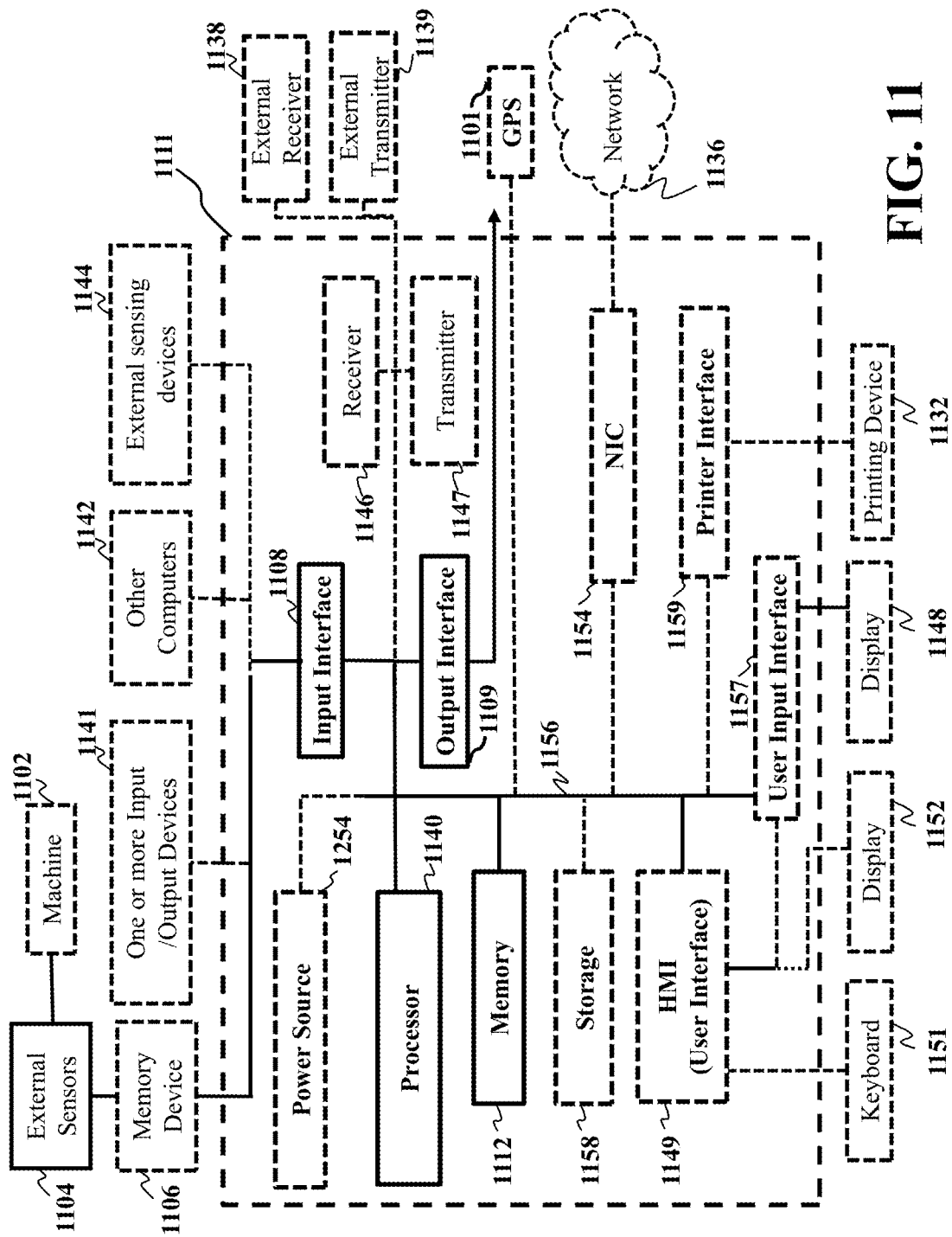
FIG. 11 shows a block diagram of various components that can be used to implement joint control using an alternate computer or hardware processor, according to some embodiments.

FIG. 11 shows a block diagram of various components that can be used to implement joint control using an alternate computer or hardware processor, according to embodiments.

The computer 1111 includes a hardware processor 1140, computer readable memory 1112, storage 1158 and user interface 1149 with display 1152 and keyboard 1151, which are connected through bus 1156. For example, the user interface 1164 in communication with the hardware processor 1140 and the computer readable memory 1112, acquires and stores the signal data examples in the computer readable memory 1112 upon receiving an input from a surface, keyboard surface 1164, of the user interface 1164 by a user.

The computer 1111 can include a power source 1154, depending upon the application the power source 1154 may be optionally located outside of the computer 1111. Linked through bus 1156 can be a user input interface 1157 adapted to connect to a display device 1148, wherein the display device 1148 can include a computer monitor, camera, television, projector, or mobile device, among others. A printer interface 1159 can also be connected through bus 1156 and adapted to connect to a printing device 1132, wherein the printing device 1132 can include a liquid inkjet printer, solid ink printer, large-scale commercial printer, thermal printer, UV printer, or dye-sublimation printer, among others. A network interface controller (NIC) 1134 is adapted to connect through the bus 1156 to a network 1136, wherein time series data or other data, among other things, can be rendered on a third-party display device, third-party imaging device, and/or third-party printing device outside of the computer 1111.

Still referring to FIG. 11, the signal data or other data, among other things, can be transmitted over a communication channel of the network 1136, and/or stored within the storage system 1158 for storage and/or further processing. Contemplated is that the signal data could be initially stored in an external memory and later acquired by the hardware processor to be processed or store the signal data in the hardware processor's memory to be processed at some later time. The hardware processor memory includes stored executable programs executable by the hardware processor or a computer for performing the resilient restoration systems/methods, power distribution system operation data, and historical power distribution system data of the same type as the power distribution system and other data relating to the resilient restoration of the power distribution system or similar types of power distribution system s as the power distribution system.

Further, the signal data or other data may be received wirelessly or hard wired from a receiver 1146 (or external receiver 1138) or transmitted via a transmitter 1147 (or external transmitter 1139) wirelessly or hard wired, the receiver 1146 and transmitter 1147 are both connected through the bus 1156. The computer 1111 may be connected via an input interface 1108 to external sensing devices 1144 and external input/output devices 1141. For example, the external sensing devices 1144 may include sensors gathering data before-during-after of the collected signal data of the power distribution system. For instance, the disaster induced faulted line segments, and faulted types, and the fault impacted customers. The computer 1111 may be connected to other external computers 1142. An output interface 1109 may be used to output the processed data from the hardware processor 1140. It is noted that a user interface 1149 in communication with the hardware processor 1140 and the non-transitory computer readable storage medium 1112, acquires and stores the region data in the non-transitory computer readable storage medium 1112 upon receiving an input from a surface 1152 of the user interface 1149 by a user.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A system for jointly controlling vehicles, comprising:
a memory configured to store a traffic configuration of a zone of intersection of a first road and a second road, wherein the intersection zone includes a sequencing zone and a control zone specified in the traffic configuration, wherein the sequencing zone includes a section of the first road and a section of the second road in proximity to the intersection, and wherein the control zone includes a section of the first road and a section of the second road between the intersection and the corresponding sections of the sequencing zone;
a processor configured to
group vehicles traveling on the first road and the second road within the sequencing zone into a set of groups of the vehicles, wherein at least some groups of the vehicles include vehicles traveling on the first road and vehicles traveling on the second road;
transmit motion constraints to the vehicles, wherein the transmitted motion constraints are configured to constrain a maximum number of vehicles allowed in the control zone by preventing the vehicles of different groups to travel simultaneously in the control zone;
determine optimal motion trajectories for the vehicles of the same group traveling in the control zone on the first and the second roads to pass the intersection by solving an optimization problem with computational complexity constrained by the maximum number of vehicles in the control zone; and
transmit the optimal motion trajectories to the corresponding vehicles.

2. The system of claim 1, further comprising:
an input interface configured to accept traffic information in the intersection zone, wherein the processor partitions the intersection zone into the sequencing zone and the control zone based on the traffic information.

3. The system of claim 1, further comprising:
an input interface configured to accept traffic information in the intersection zone, wherein the intersection zone includes an information zone preceding the sequencing zone, such that in the traffic configuration stored in the memory the sequencing zone is sandwiched between the information zone and the control zone, wherein the processor is configured to determine states of vehicles traveling within the information zone;
track the state of the vehicles within the information zone to estimate a current state of the vehicles within the sequencing zone; and
group the vehicles in the sequencing zone based on their current states.

4. The system of claim 1, wherein the processor determines different motion constraints for the vehicles of different groups to prevent the vehicles of different groups to travel simultaneously in the control zone ensuring that the first vehicle of the following group cannot pass the last vehicle of the preceding group.

5. The system of claim 4, wherein the constraints on the motion include one or a combination of a lane shift constraint, a speed constraint, an acceleration constraint, and a headway constraint.

6. The system of claim 4, wherein the vehicles in the sequencing zone are grouped into a first group and a second group, wherein the processor determines a minimum speed constraint for the vehicles of the first group and a maximum speed constraint for the vehicles of the second group.

7. The system of claim 1, wherein the processor assigns the vehicles in the sequencing zone into different groups based on an estimation of time of vehicle arrival to the control zone and based on the maximum number of the vehicles allowed in the control zone.

8. The system of claim 7, wherein the processor solves a mixed-integer linear problem to determine optimal times of the vehicles arriving at the intersection and speed constraints ensuring that the vehicles of different groups arrive at the intersection sequentially.

9. The system of claim 1, wherein the system is arranged on an edge device placed in proximity to the intersection.

10. The system of claim 9, wherein the edge device further comprises:
a set of sensors to collect traffic information in the intersection zone, wherein the processor of the system is configured to perform the grouping and the joint controlling based on the traffic information; and
a transmitter to transmit to the vehicles in the control zone the motion constraints and corresponding trajectories.

11. A method for jointly controlling vehicles, wherein the method uses a processor coupled to a memory storing a traffic configuration of a zone of intersection of a first road and a second road, wherein the intersection zone includes a sequencing zone and a control zone specified in the traffic configuration, wherein the sequencing zone includes a section of the first road and a section of the second road in proximity to the intersection, and wherein the control zone includes a section of the first road and a section of the second road between the intersection and the corresponding sections of the sequencing zone, wherein the processor is coupled with stored instructions implementing the method, wherein the instructions, when executed by the processor carry out steps of the method, comprising:
grouping vehicles traveling on the first road and the second road within the sequencing zone into a set of groups of the vehicles, wherein at least some groups of the vehicles include vehicles traveling on the first road and vehicles traveling on the second road;
transmitting motion constraints to the vehicles, wherein the transmitted motion constraints are configured to constrain a maximum number of vehicles allowed in the control zone by preventing the vehicles of different groups to travel simultaneously in the control zone;
determining optimal motion trajectories for the vehicles of the same group traveling in the control zone on the first and the second roads to pass the intersection by solving an optimization problem with computational complexity constrained by the maximum number of vehicles in the control zone; and
transmitting the optimal motion trajectories, thereby causing the vehicles in the control zone to follow the corresponding optimal motion trajectories.

12. The method of claim 11, wherein the preventing the vehicles of different groups to travel simultaneously in the control zone includes placing different motion constraints on the vehicles of different groups.

13. The method of claim 12, wherein the vehicles in the sequencing zone of the first road and the second road are grouped into a first group and a second group, wherein the preventing includes placing minimum speed constraints on the vehicles of the first group and maximum speed constraints on the vehicles of the second group.

14. The method of claim 12, wherein the constraints on the motion include one or a combination of a lane shift constraint, an acceleration constraint, and a proximity constraint.

15. The method of claim 11, wherein the grouping comprises:
grouping the vehicles on the first road and the second road based on current states of the vehicles on the first road and the second road.

16. The method of claim 15, further comprising:
determining the states of the vehicles within an information zone wherein the information zone precedes the sequencing zone, such that in the traffic configuration the sequencing zone is sandwiched between the information zone and the control zone; and
tracking the state of the vehicles within the information zone to estimate the current state of the vehicles within the sequencing zone.

17. The method of claim 15, wherein the grouping comprises:
estimating corresponding future times of the vehicles entering the control zone based on the current state of the vehicles on the first road and the second road; and
grouping the vehicles in the set of groups based on their corresponding entering times.

18. The method of claim 15, wherein the grouping comprises:
assigning the vehicles into different groups based on a proximity of each vehicle to the control zone and based on the maximum allowed number of the vehicles in the control zone.

19. The method of claim 11, wherein the steps of the method are performed by the processor of an edge device installed in a proximity to the intersection.

20. A non-transitory computer readable storage medium embodied thereon a program executable by a processor for performing a method, the method comprising:
accessing a traffic configuration of a zone of intersection of a first road and a second road, wherein the intersection zone includes a sequencing zone and a control zone specified in the traffic configuration, wherein the sequencing zone includes a section of the first road and a section of the second road in proximity to the intersection, and wherein the control zone includes a section of the first road and a section of the second road between the intersection and the corresponding sections of the sequencing zone;
grouping vehicles traveling on the first road and the second road within the sequencing zone into a set of groups of the vehicles, wherein at least some groups of the vehicles include vehicles traveling on the first road and vehicles traveling on the second road;
transmitting motion constraints to the vehicles, wherein the transmitted motion constraints are configured to constrain a maximum number of vehicles allowed in the control zone by preventing the vehicles of different groups to travel simultaneously in the control zone;
determining optimal motion trajectories for the vehicles of the same group traveling in the control zone on the first and the second roads to pass the intersection by solving an optimization problem with computational complexity constrained by the maximum number of vehicles in the control zone; and
transmitting the optimal motion trajectories, thereby causing the vehicles in the control zone to follow the corresponding optimal motion trajectories.

* * * * *